Jan. 8, 1929.                    1,698,379
J. TAYLOR
ELECTRICAL CONNECTER
Filed May 21, 1927
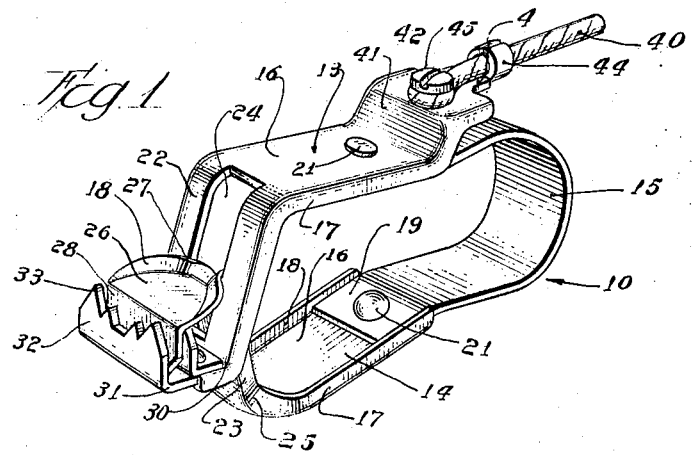
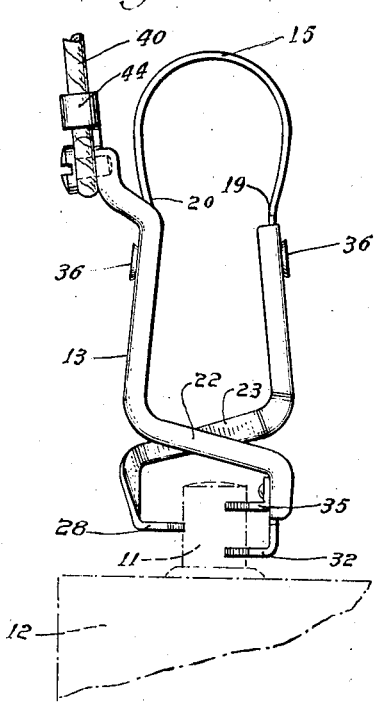
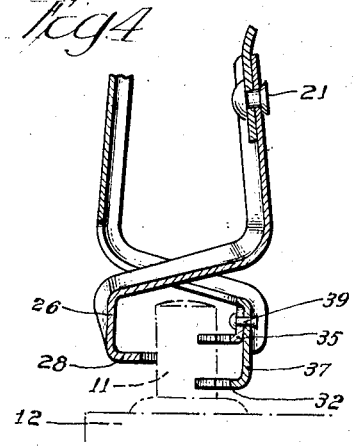
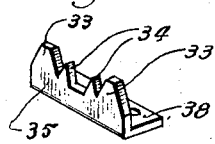
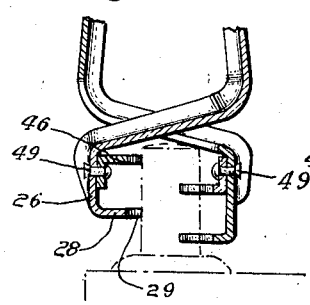
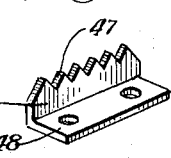
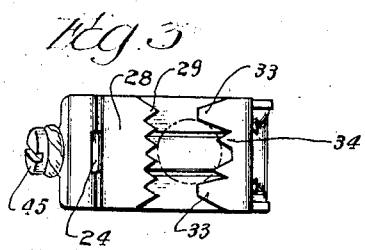
Inventor
John Taylor
Williams, Bradbury,
McCaleb & Hinkle
Attys.

Patented Jan. 8, 1929.

1,698,379

UNITED STATES PATENT OFFICE.

JOHN TAYLOR, OF CHICAGO, ILLINOIS, ASSIGNOR TO THE BATTERY EQUIPMENT AND SUPPLY COMPANY, OF CHICAGO, ILLINOIS, A CORPORATION OF ILLINOIS.

ELECTRICAL CONNECTER.

Application filed May 21, 1927. Serial No. 193,077.

My invention relates to electrical connecters, being more particularly concerned with the provision of storage battery terminal clips.

One of the objects of my invention is the provision of a novel storage battery terminal clip having sharp serrated jaws for penetrating through an external layer of corrosion or foreign matter, together with means for actuating said jaws comprising a detachable clamp which is adapted to exert balanced forces upon said jaws to retain the same upon a terminal post.

Another object of my invention is the provision of a novel storage battery clip structure which is more efficient, sturdy and more economically manufactured than the clips of the prior art, and which is adapted to form a quick and positive electrical connection to a standard battery terminal post with a minimum consumption of time and effort.

Another object of my invention is the provision of a storage battery terminal clip comprising a pair of oppositely disposed jaw supporting arms having central webs and reinforcing flanges, one of said webs being cut away to permit the passage of the other of said arms, and both of said arms being permanently affixed to the ends of a strong metal spring in such manner that a plurality of jaws upon the ends of said arms are urged toward each other to clamp a battery terminal post.

Other objects and advantages of my invention will appear more fully from the following description, and from the accompanying drawings, in which similar characters of reference indicate similar parts throughout the several views.

Referring to the drawings:

Fig. 1 is a view in perspective of my novel storage battery terminal clip.

Fig. 2 is a side elevational view of the same, showing the clip upon a storage battery terminal post.

Fig. 3 is an end view of the clip in the same position as in Fig. 2.

Fig. 4 is a medial cross-sectional view of the arms and jaws in the position of Fig. 2.

Fig. 5 is a view in perspective of the concave serrated jaw.

Fig. 6 is a view similar to Fig. 4, of a modified form of construction, and,

Fig. 7 is a view in perspective of the other serrated jaw.

Referring to Figs. 1 and 2, 10 indicates in its entirety my storage battery terminal clip, which is illustrated in the connected position upon a terminal post 11 of a storage battery 12. The terminal clip 10 comprises a pair of jaw supporting arms 13 and 14, which are permanently secured to a spring 15, which is bent back on itself, forming a substantially U-shaped spring member.

The arms 13 and 14 may be constructed by stamping the same out of sheet metal, such as steel, and the arms are preferably provided with a central web portion 16 bounded by inwardly extending reinforcing flanges 17 and 18 substantially at right angles to the web 16. The spring 15 may comprise a sheet metal member preferably constructed of tempered steel, the width of the spring 15 being substantially the width of the webs 16 of the arms 13 and 14 in such manner that the ends of the spring 15 are adapted to fit within the channel formed by said web and reinforcing flanges.

By means of the construction described, the ends 19 and 20 of the spring 15 may be permanently affixed to the arms 13 and 14 by placing said ends within the channels described, and by securing rivets 21 through said arms and spring to permanently fasten the same together. As the edges of the spring 15 are adapted to bear against the inwardly extending flanges 17 and 18 the co-operation of these parts with the rivets effectively prevents any rotative motion of the arms upon the spring, and provides a very simple and efficient form of fastening for the same.

The rivets 21 may have their heads disposed within the channels of the arms 13 and 14, the exterior riveted portions 36 being made flat in form to avoid the formation of projections upon the finger engaging surface of the arms.

The arms 13 and 14 are formed with inwardly extending offset portions 22 and 23 in opposed relation to each other, and the web 16 of the arm 13 is cut away, as at 24, forming an elongated aperture through which the offset 23 of the arm 14 may extend. For this purpose also the offset portion 23 of the arm 14 may have its web 16 considerably narrower than the balance of the arm in such manner that the offet 23 is of such width that it may be received in the slot 24. It will thus be observed that the arm 14 has its sides tapered, as at 25, to form a relatively narrow offset 23.

The arm 23 may have its web again widened, as at 26, the arm being bent, as at 27, just outside the slot 24 at an angle slightly greater than a right angle to extend in the same direction as the main portion of the arm 14.

The reinforcing flanges 17 and 18 may also gradually taper in width adjacent the flat portion 26, the metal of these flanges being flattened out at the extreme end 28 of the arm to increase the width thereof. The extreme end 28 of the arm 14 may be bent at right angles to the flat portion 26 in a direction extending toward the end of the opposite arm 13 to form a jaw 28 which may be provided with a plurality of sharp serrations 29 projecting substantially equal distances from the jaw 28.

The arm 13 may be of substantially the same width throughout its length, and the offset 22 of the arm 13 may likewise be bent, as at 30, in a direction substantially parallel to the main portion of the arm, to form a similar opposed jaw supporting end.

The web 16 of the arm 13 may be extended and bent upward at right angles, as at 31, forming a second projecting jaw 32, which may also be provided with a plurality of sharp serrations 33.

The flanges 17 and 18 may terminate at any point before the bend 31 and jaw 32, as the reinforcement provided by these flanges is not required upon the jaw 32.

The serrations 33 upon the jaw 32 are preferably not identical in form, but may consist of a plurality of serrations 33 and 34 having their points arranged substantially in the line of a circle so that the terminal 11 may be received in the concavity presented by said points. At the same time all of the points of the serrations 33 and 34 are adapted to contact with the side of the cylindrical terminal 11, and the outermost serrations 33 have their inner wall preferably so located that these teeth will also grip into the terminal 11. That is, the space between the teeth 33 is substantially less than the width of that portion of the terminal 11 received therein.

A similar jaw 35 is further illustrated in perspective in Fig. 5, and it will be observed that the teeth 33 and 34 have their points so located that all of these points will engage the battery terminal 11.

The flat portion 37 of the arm 13 is preferably of greater length than the flat portion 26 on the opposite arm, so that the jaw 32 may be disposed somewhat lower than the jaw 28, as will be observed in Figs. 2 and 4.

The jaw 35 is formed with an attaching flange 38 at right angles to the teeth, and the attaching flange 38 is secured to the flat portion 37 by a plurality of rivets 39 in such manner that the jaws 32 and 35 are substantially parallel.

The location of the jaw 35 upon the flat portion 37 should preferably be such that its teeth are disposed a distance above the teeth of the jaw 28, which is equal to the distance between the levels of the teeth on the jaw 28 and the teeth on the jaw 32. In other words the jaw 28 is preferably disposed medially between the jaws 32 and 35 so that three gripping lines provide for the terminal post 11 by the three jaws which are adapted to determine the position of the clip upon the post. Furthermore since there are two concavely serrated jaws, the terminal post 11 received in said jaws is firmly gripped thereby and the said teeth 33, or both jaws effectively prevent rotative movement of the clip upon the post.

It will thus be observed that the opposed jaws 28 and 32 are adapted to form a stop against which the spring 15 is tensioned when the clip is not in use and the crossing arrangement of the arms at the offsets 22 and 23 enables the jaws to be moved apart by simply pressing upon the arms 13 and 14 with the fingers. The reinforcing flanges upon the arms also provide a very sturdy structure for the terminal clip, notwithstanding the removal of a large portion of the web 16 to form the aperture 24, and the broad surface provided by the web 16 adjacent the rivets 21 furnishes a convenient point for manual grip which enables the opening of the jaws by pressure exerted by the fingers, although the spring 15 is of considerable strength and is adapted to cause the points of the jaws to penetrate through any corrosion to form a good electrical contact with the post 11.

In order to provide contact means for connecting the usual stranded electrical conductor 40, the arm 13 may be extended beyond the rivet 21 having an upwardly turned portion 41 terminating in a portion 42 substantially parallel to the arm. The flat portion 42 may be provided with an integral extension 43 having a pair of laterally extending ends 44 in the form of a T, and the flat portion 42 may be provided with a threaded aperture for reception of a screw bolt 45. The flanges 17 and 18 may be continued along the sides of the offset 41 and the flat portion 42 in order to reinforce this portion of the arm.

It will thus be observed that the electrical conductor 40 may be wrapped about the screw bolt 45, and the screw bolt 45 may be used to clamp the loop thus formed in the conductor. The laterally projecting ends 44 may be bent upward about the electrical conductor 40 and about the opposite end of the conductor, if desired, to hold these parts firmly in the connected relation. The formation of the offset 41 enables the screw 45 to be threaded into the flat portion 42 without interference between the screw bolt and the spring 15, and without the formation of any apertures in the spring, which would otherwise considerably weaken the spring.

The assembly of my terminal clip may be as follows:

The arms 13 and 14, having been formed as shown, the arm 14 may be turned laterally and the jaw 28 inserted through the elongated slot 24, after which the arm 14 may be turned about as shown, and both arms riveted to the spring 15.

Referring to Fig. 6, I have here shown a modification of my terminal clip in which the flat portion 26 of the arm 14 has been provided with a second jaw 46. The jaw 46 may comprise a sheet metal member having a plurality of sharp teeth 47 substantially aligned like the teeth 29 of the jaw 28.

The jaw 46 has a supporting flange 48 at substantially right angles to the jaw, and the depth of the jaw from the teeth to the lower side of the supporting flange should be such that when the jaw is supported on the flat portion 26, the teeth 47 and the teeth 29 project from the arm substantially equal distances. The jaw 46 may be affixed to the flat portion 26 with the flange 48 extending downward toward the jaw 28, by means of a plurality of rivets 49 extending through the flat portion 26 and the attaching flange 48.

It will be observed that the attaching flange 48 of the jaw 46 is inverted in position relative to the attaching flange 38 of the jaw 35, thus enabling the location of the jaw 46 in such a position that the jaw 35 is midway between the jaws 46 and 28. The provision of the extra jaw member 46 increases slightly the stability of the terminal clip upon the post 11 as it provides an additional gripping point, as well as increased contact surface for conducting the current.

It will thus be observed that I have invented a storage battery terminal clip in which a plurality of jaws are provided which are adapted to cut through any exterior layer of corrosion or foreign matter, and to grip firmly into the metal of the terminal post. Furthermore, the relation described between my clamping jaws and the opposed arms of the clip enables the jaws to support the clip upon the post in fixed relation without danger of the clip falling over, or without the tension of the spring tending to cause the clip to slip off the post. The arrangement of the arms with one arm passing through the other enables the spring to exert balanced forces upon the jaws as each of the arms is directly opposed to the other, although the arms cross each other at the offset portions.

While I have illustrated and described a specific embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new, and desire to secure by Letters Patent of the United States is:

1. In a storage battery terminal clip, the combination of a flat metal spring bent back on itself, with a pair of arms, one secured at each end of said spring, the first of said arms having an aperture to pass the inwardly bent end of the second arm, and backwardly turned opposing jaws on said arms, one jaw on either arm being disposed between two jaws on the other arm, one of said arms having its end bent up from said spring and having a threaded aperture for a screw connecter.

2. In a storage battery terminal clip, the combination of a flat metal spring bent back on itself, with a pair of arms, one secured at each end of said spring, the first of said arms having an aperture to pass the inwardly bent end of the second arm, and backwardly turned opposing jaws on said arms, one jaw on either arm being disposed between two jaws on the other arm, one of said arms having its end bent up from said spring and having a threaded aperture for a screw connecter, said end being provided with a pair of integral ears adjacent said screw for clamping about an electrical conductor held by said screw connecter.

3. In a storage battery terminal clip, the combination of a flat metal spring bent back on itself, with a pair of arms, one secured at each end of said spring, each of said arms having a central web and lateral reinforcing flanges, and each of said arms being offset, extending toward the other, and one of said arms having its web cut away at said offset to pass the other arm, a plurality of serrated jaws carried by the ends of said arms, and a second offset formed on the end of one of said arms extending away from said spring, said latter offset having a threaded aperture, a screw therein and a pair of integral ears for bending about an electrical conductor held by said screw.

In witness whereof, I hereunto subscribe my name this 18th day of May, 1927.

JOHN TAYLOR.